(12) United States Patent
Hardy et al.

(10) Patent No.: US 8,612,525 B2
(45) Date of Patent: Dec. 17, 2013

(54) SYSTEM AND METHOD FOR INTEGRATING AN ADDRESS BOOK WITH AN INSTANT MESSAGING APPLICATION IN A MOBILE STATION

(75) Inventors: Michael Thomas Hardy, Waterloo (CA); Craig A. Dunk, Guelph (CA); Gerhard D. Klassen, Waterloo (CA)

(73) Assignee: BlackBerry Limited, Waterloo (CA)

( * ) Notice: Subject to any disclaimer, the term of this patent is extended or adjusted under 35 U.S.C. 154(b) by 227 days.

(21) Appl. No.: 12/813,336

(22) Filed: Jun. 10, 2010

(65) Prior Publication Data

US 2010/0251138 A1    Sep. 30, 2010

Related U.S. Application Data

(63) Continuation of application No. 10/848,206, filed on May 18, 2004.

(60) Provisional application No. 60/496,143, filed on Aug. 19, 2003.

(51) Int. Cl.
*G06F 15/16* (2006.01)

(52) U.S. Cl.
USPC .......................................................... 709/206

(58) Field of Classification Search
USPC ................... 715/752; 709/206; 707/1
See application file for complete search history.

(56) References Cited

U.S. PATENT DOCUMENTS

| | | | |
|---|---|---|---|
| 6,745,048 B2 | 6/2004 | Vargas et al. | |
| 6,785,713 B1 | 8/2004 | Freeman et al. | |
| 7,010,573 B1 | 3/2006 | Saulpaugh et al. | |
| 7,058,036 B1 | 6/2006 | Yu et al. | |
| 7,076,766 B2 | 7/2006 | Wirts et al. | |
| 7,249,161 B2 | 7/2007 | Srinivas et al. | |
| 2002/0035618 A1 | 3/2002 | Mendez et al. | |
| 2002/0049738 A1 | 4/2002 | Epstein | |
| 2002/0111995 A1 | 8/2002 | Mansour et al. | |
| 2002/0184089 A1 | 12/2002 | Tsou et al. | |
| 2003/0028525 A1 | 2/2003 | Santos et al. | |
| 2003/0028526 A1 | 2/2003 | Fitzpatrick et al. | |
| 2003/0037103 A1* | 2/2003 | Salmi et al. | 709/203 |
| 2003/0061132 A1 | 3/2003 | Yu et al. | |
| 2003/0073440 A1 | 4/2003 | Mukherjee et al. | |
| 2003/0126136 A1 | 7/2003 | Omoigui | |
| 2003/0130984 A1 | 7/2003 | Quinlan et al. | |
| 2003/0131023 A1 | 7/2003 | Bassett et al. | |
| 2004/0015548 A1* | 1/2004 | Lee | 709/204 |
| 2004/0024822 A1 | 2/2004 | Werndorder et al. | |
| 2004/0044647 A1* | 3/2004 | Salmenkaita | 707/1 |

(Continued)

OTHER PUBLICATIONS

Klaus-Joseph Kunte et al.: "Ubiquitous Network Address Book Server for device independent phonebook and contact list data exchange with secured data access," Siemens Technik Report, vol. 5, No. 18, Aug. 2002, p. 66, XP007003396.

(Continued)

*Primary Examiner* — Quang N Nguyen
(74) *Attorney, Agent, or Firm* — Jones Day (57) ABSTRACT

This relates to a method for operating a mobile station. The method includes grouping two or more member addresses into a group. The group is presented as a group data in a transient data list. A selection of an option to open a messaging session with the group is selected. A messaging session is opened, with the member addresses of the selected group.

8 Claims, 8 Drawing Sheets

(56) References Cited

U.S. PATENT DOCUMENTS

| | | | |
|---|---|---|---|
| 2004/0054736 A1 | 3/2004 | Daniell et al. | |
| 2004/0158611 A1 | 8/2004 | Daniell et al. | |
| 2004/0186887 A1 | 9/2004 | Galli et al. | |
| 2004/0203467 A1 | 10/2004 | Liu et al. | |
| 2004/0267887 A1* | 12/2004 | Berger et al. | 709/206 |
| 2004/0268265 A1* | 12/2004 | Berger | 715/752 |

OTHER PUBLICATIONS

PCT International Search Report (PCT/CA2004/000762 filed May 21, 2004) mailed Jan. 25, 2005.
CIPO: Office Action issued Jul. 22, 2010 for Application No. 2,535,431 (5 pages).
EPO: Extended European Search Report for Application No. 10185402.4-2201 dated Jun. 21, 2011 (6 pages).
EPO: Extended European Search Report for Application No. 10185424.8-2201 dated Jun. 21, 2011 (6 pages).
EPO: Extended European Search Report for Application No. 10185443.8-2201 dated Jun. 21, 2011 (5 pages).
Sudlow, E.: "Chatting on AOL—alt.culture.us.1970s," Jun. 8, 1999 (1 page) (retrieved from the Internet on May 13, 2011: URL:http://groups.google.com/group/alt.culture.us.1970s/msg/0f91da71c5aa4da5) XP002636776.
EPO: Office Action for Application No. 04 734 195.3-2201 dated Feb. 22, 2011 (6 pages).
Siracusa, J.: "Mac OS X 10.2 Jaguar," http://arstechnica.com/apple/reviews/2002/09/macosx-10-2.ars/12 (retrieved on Feb. 16, 2011), Sep. 5, 2002 (5 pages).
EPO: Summons to attend oral proceedings pursuant to Rule 115(1) EPC dated Nov. 4, 2011 for Application No. 04734195.3-2201 (6 pages).
Microsoft: "Pocket Outlook Object Model," Sep. 2, 2004, XP-002323901, Retrieved from the Internet: URL:http://msdn.microsoft.com/library/default.asp_conpocketoutlookobjectmodel.asp [retrieved on Apr. 8, 2005] (5 pages).
EPO: Communication pursuant to Article 94(3) EPC for Application No. 10 185 402.4-1952 dated Mar. 5, 2013 (6 pages).
EPO: Communication pursuant to Article 94(3) EPC for Application No. 10 185 424.8-1952 dated Mar. 5, 2013 (5 pages).
CIPO: Requisition (Office Action) for Application No. 2,535,431 dated Sep. 20, 2011 (2 pages).
SIPO: First Office Action dated Mar. 7, 2008 for Chinese Application No. 200480023644.7 (8 pages).
Translation of SIPO's First Office Action dated Mar. 7, 2008 for Chinese Application No. 200480023644.7 (3 pages).
'2000 ACM conference on Computer supported cooperative work,' pp. 89-96, Milewski, et al., ACM, Dec. 2000.
'Mozilla, an Old Browser New Again,' Newsbytes, Jun. 2002.
'AOL, Yahoo Buddy Up to Wireless Messaging,' Tom Spring, PC World, Mar. 2001.
'Critical Path Adds Enhanced Mobility, New Applications and Greater Integration to Communications Platform,' p. 226, Business Wire, Dec. 2002.
'Yahoo! Brings Friends and Family Face-to-Face as First Instant Messaging Service to Integrate Webcam Functionality,' p. 2087, Business Wire, Jun. 2001.
'Yahoo! Opens a New Place for Communities With Yahoo! Groups; Free E-Mail and Web-Based Group Communications Tools Make It Easy and Convenient to Stay Connected,' p. 178, Business Wire, Jan. 2001.
'Yahoo! Mail Announces Encrypted E-Mail Delivery Option,' p. 2100, Business Wire, Nov. 2000.
'Agilent Signs Portfolio License Agreement with Parthus for Range of Industry-Leading Mobile Internet Platforms,' Newswire, Oct. 2000.
'Yahoo! Mail Launches New Personalized E-mail Addresses,' p. 54, Business Wire, Oct. 2000.
'Parthus Launches InfoStream, the Industry's Most Advanced Mobile Internet-on-a-Chip Platform for Next Generation Smartphone Devices,' Newswire, Oct. 2000.
'Yahoo! Experts Has Your Answers; Yahoo! Experts Brings Together a Wealth of Knowledge to Answer Almost Any Question,' p. 2198, Business Wire, Sep. 2000.
'Repeat/Global Ties and Multilingual Platform Position Orientation.com as Major Contender in New Internet Markets Across Six Continents,' p. 2345, Business Wire, Sep. 2000.
'ALLTEL Launches Wireless Internet Powered by InfoSpace's Platform and Suite of Services,' Newswire, Aug. 2000.
'Compuserve Momentum Accelerates as Value Market Leader With New Rebates, New Custom Deals, and All-New Version of CompuServe 2000; Introduces Instant Rebate with CompUSA,' p. 1235, Business Wire, Oct. 1999.
Planetall Looks to Future With New Interface, Telecomworldwire, Oct. 1997.
'Critical year for IP centrex: Features and functions exceed traditional centrex but still lag IP-PBXs, and availability is extremely limited. Do or die in 2002?,' Larry Hettick, Business Communications Review, Feb. 2002.
'Infospace Positioned for Rapid Expansion Worldwide with New Spanish-Language Wireless Platform and Applications Rapidly Expand in Central and South America, and among Spanish Speakers in the U.S.,' Newswire, Mar. 2001.
'Commtouch Opens UK Headquarters,' Newswire, Feb. 2000.
'Bellwave signs multimillion dollar contract with major Chinese distributor,' China Telecom, Aug. 2003.
'Tools Get a Handle on E-Mail,' eWeek, Dec. 2002.
'Reader Review: McAfee.com SpamKiller; A reader writes in with a detailed assessment of McAfee.com's anti-spam software. The upshot: It's a polished product that lacks some key features and doesn't automate enough functions,' Internet Week, Sep. 2002.
'Bellwave Signs Multimillion Dollar Contract with Major Chinese Distributor; Panda to Purchase Bellwave's Latest GPRS Design with Digital Camera,' p. 5008, Business Wire, Aug. 17, 2003.
'Java Pioneer Creates World's First 100% Java Mobile Communications and Gaming Device; aJile to License Reference Design for Next-Generation Wireless PDAs and Handsets,' p. SFM00101072002, Newswire, Jul. 2002.
'Novell to Integrate White Pine's CU-SeeMe Web Technology Into digitalme Internet Service,' p. 1353, Business Wire, Oct. 1999.
'The Microsoft Network Previews Service Upgrade,' p. 721SFM041, Newswire, Jul. 1997.
'Instant messaging fit for the enterprise,' Debbie Galante, EContent, Jan. 2003.
'Critical Path Expands Messaging Solutions for Carriers to Target Both Consumers and Enterprise-Enhanced Critical Path Communications Platform Enables Carriers and Service Providers to Leverage Integrated Customizable Solution for Multiple Markets,' Business Wire, Dec. 2002.

* cited by examiner

```
⌘Address: John Smith    Time: 12:45

Employee: Research In Motion
Address: 295 Phillip St. Waterloo
   § Home: 555-1234
   § Work: 516-555-1445
   § Cell: 111-555-4567
   ✉Email: jsmith@rim.net
   ⌨IM Online: JsmithsCurrentHandle 📁Notes: New Business Contact
```

*Fig. 5*

```
[IM] IM: Name Selection    Time: 12:50

Contact Name      Buddy List

Adam Sandler      adamsandler234
Betty Crocker     BakeMeNow
Daniel Boone      HunterRus
⇒ John Smith      JsmithsCurrentHan...
Tom Jones         JonesBones
```

*Fig. 6A*

```
[IM] IM: Name Selection    Time: 12:50

Contact Name     B| Hide Menu
Adam Sandler     a| Open IM Session
Betty Crocker    B| Edit Address
Daniel Boone     H| Delete Address
⇒ John Smith     J| Create New Addr.
Tom Jones        J| Close Application
```

SYSTEM AND METHOD FOR INTEGRATING AN ADDRESS BOOK WITH AN INSTANT MESSAGING APPLICATION IN A MOBILE STATION

CROSS-REFERENCE TO RELATED APPLICATION

This is a continuation of U.S. patent application Ser. No. 10/848,206, filed May 18, 2004, which claims the benefit of U.S. Provisional Application No. 60/496,143, filed Aug. 19, 2003, both applications hereby incorporated herein by reference.

TECHNICAL FIELD

The technology described in this patent document relates generally to the field of wireless communication devices. More particularly, the patent document describes a system and method for integrating an address book with an instant messaging application in a mobile station.

BACKGROUND

Mobile stations are proliferating both in quantity and type. The types of mobile stations may include cell phones, smart phones, PDAs, pagers, phone-enabled laptop computers and a range of other devices. The applications available to a mobile station are also expanding rapidly. One of the newest applications to be ported to a mobile station is the instant messaging applications. In a typical mobile station, however, multiple address or contact databases are not integrated. For instance, addresses used in an instant messaging application (instant messaging "handles") along with other instant messaging information (e.g., presence information) are typically not integrated with contact information in an address book application.

SUMMARY

In accordance with the teachings described herein, systems and methods are provided for integrating an address book application with an instant messaging application in a mobile station. An instant messaging database may be used to store instant messaging data, the instant messaging data including instant messaging contacts and instant messaging (IM) presence information to indicate whether the instant messaging contacts may currently be accessed by the instant messaging application. An address book database may be used for storing address book data. In one embodiment, an aggregated data viewer may be used to relate instant messaging data from the instant messaging database with address book data from the address book database. In another embodiment, an aggregated data and facilities database may be used to relate instant messaging data from the instant messaging database with address book data from the address book database.

An instant messaging user interface for use in the mobile station may include a buddy list and a contacts name list. The buddy list may include a list of instant messaging (IM) handles that are stored in the instant messaging database and that may be contacted using the instant messaging software application. The contact name list may provide address book data corresponding to one or more of the IM handles in the buddy list. In another embodiment, an instant messaging user interface for use in the mobile station may include an instant messaging (IM) group list, a contact name list, and instant messaging presence information. The IM group list may include a list of IM groups, wherein each IM group represents a plurality of instant messaging (IM) handles that are stored in the instant messaging database and that may be contacted using the instant messaging software application. The contact name list may provide address book data corresponding to one or more of the IM handles in each of the IM groups. The instant messaging presence information may indicate a number of IM handles in each group that are currently available to be contacted via the instant messaging application.

DETAILED DESCRIPTION

Figure 1:
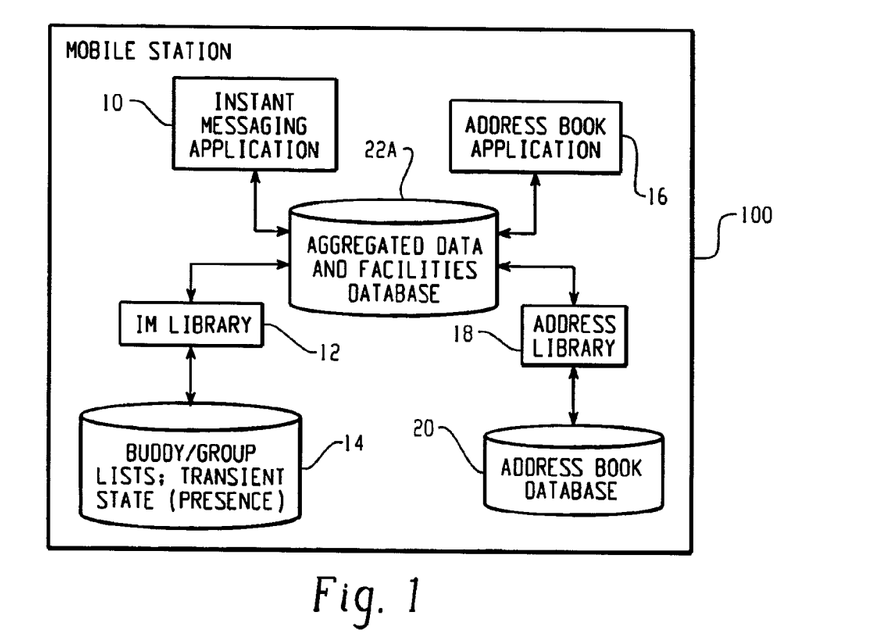
FIG. 1 is a block diagram of an example system for integrating an address book application with an instant messaging application in a mobile station.

With reference now to the drawing figures, FIG. 1 is a block diagram of an example system for integrating an address book application 16 with an instant messaging application 10 in a mobile station 100. In addition to the address book application 16 and the instant messaging application 10, the system includes an instant messaging (IM) library module 12, an instant messaging database 14, an address library module 18, an address book database 20, and an aggregated data and facilities database 22A.

The instant messaging application 10 is a software application that provides a user interface for creating, viewing and managing instant messages and related instant messaging data, such as instant messaging contact information (i.e., IM handles) or other IM data. The buddy/group list and transient state database 14 (the "IM database") stores IM data, such as IM handles (e.g., a buddy list), IM handle group information (e.g., group lists), transient state data relating to one or more IM handles, and/or other instant messaging data. Transient state data may include instant messaging (IM) presence information, which indicates the current status (e.g., online or offline) of an instant messaging contact. The IM library 12 is an application program interface (API) that provides a generic interface to the IM database 14. In addition, the IM library 12 may perform other object-oriented software functions, such as displaying IM data, presenting menu items relating to IM data or other functions.

The address book application 16 is a software application that provides a user interface for creating, viewing and managing address book data, such as contact names, addresses, email addresses, telephone numbers, and other information. The address book database 20 stores address book data. The address library 18 is an application program interface (API) that provides a generic interface to the address book library 20, and may also perform other object oriented software functions, such as displaying address book data, presenting menu items relating to address book data or other functions.

The aggregated data and facilities database 22A may be used to establish a relationship between the address book application 16 and the instant messaging application 10. This relationship also extends between the IM database 14 and the address book database 20. The aggregated data and facilities database 22A enables the mobile station 100 to relate IM handles and other IM data from the IM database 14 with address book data from the address book database 20. Data propagated into the aggregated data and facilities database 22A may, for example, be presented and manipulated by the address book application 16 and/or the instant messaging application 10. In this manner, the address book application 16 may be used to manage data from all available communication methods (e.g., e-mail, SMS, IM and Phone). In addition, address book data may be accessed and manipulated from the instant messaging application 10.

In operation, the address book application 16 may be used to enter both address book data (e.g., name, address, telephone number, etc.) and static instant messaging data (e.g., IM handles) into the aggregated data and facilities database 22. The IM messaging application may be used to enter static instant messaging data (e.g., IM handles) into the aggregated data and facilities database 22, and may also automatically update the database 22 with current transient instant messaging data (e.g., IM presence information). The IM library API 12 and the address book library API 18 propagate this information to their respective databases 14, 20. In addition, the IM library API 12 and address book library API 18 may place data from their respective databases 14, 20 into the aggregated data and facilities database 22A to relate IM data with address book information. For example, the IM library API 12 and the address library API 18 may access IM and address book data to build buddy and group lists, as illustrated in FIGS. 5-7B. The IM and address book data propagated to the aggregated data and facilities database 22A may then be displayed and/or manipulated using the address book application 16 and/or the instant messaging application 10.

Figure 2A:
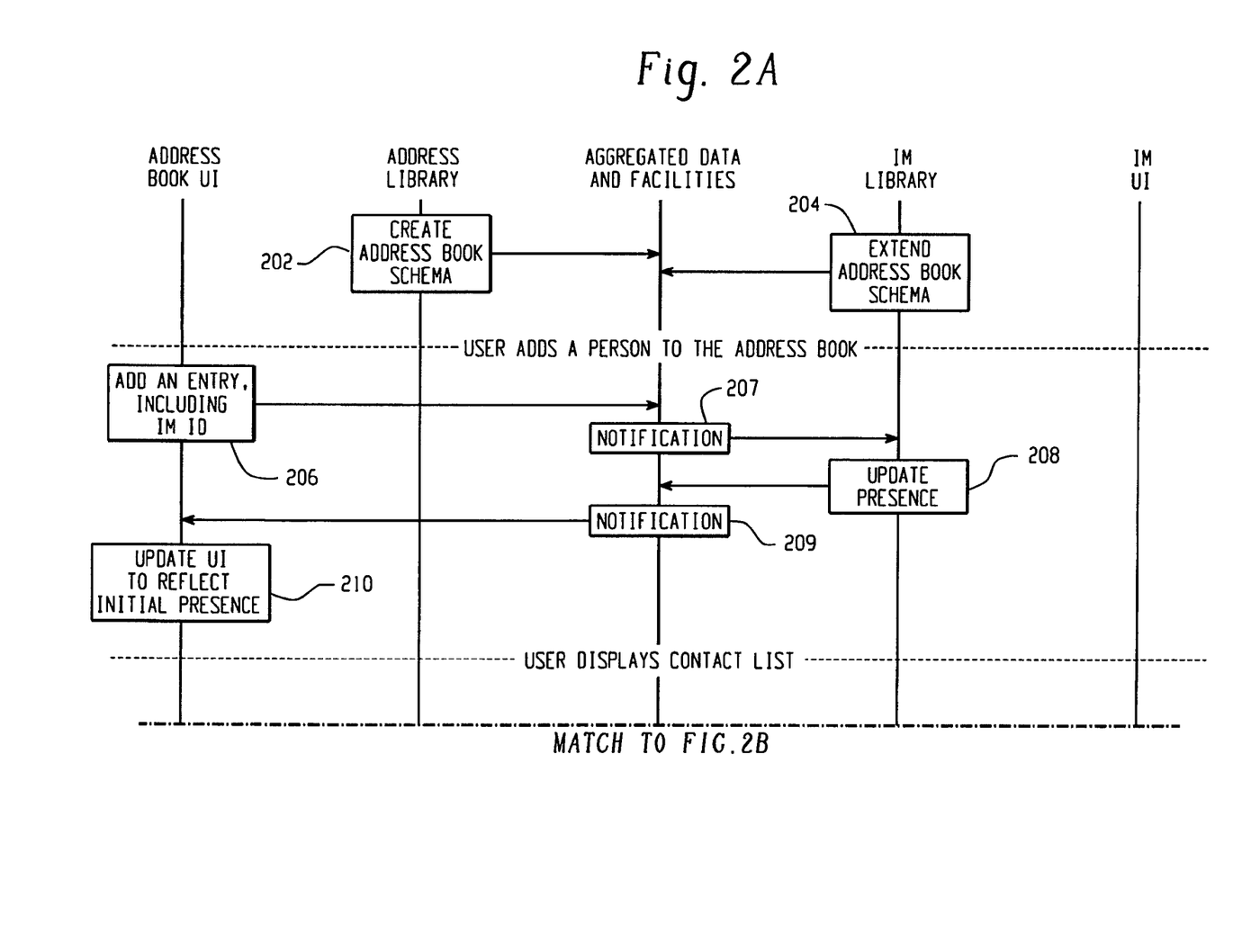
FIGS. 2A and 2B include four signal flow diagrams illustrating an example operation of the system of FIG. 1.
Figure 2B:
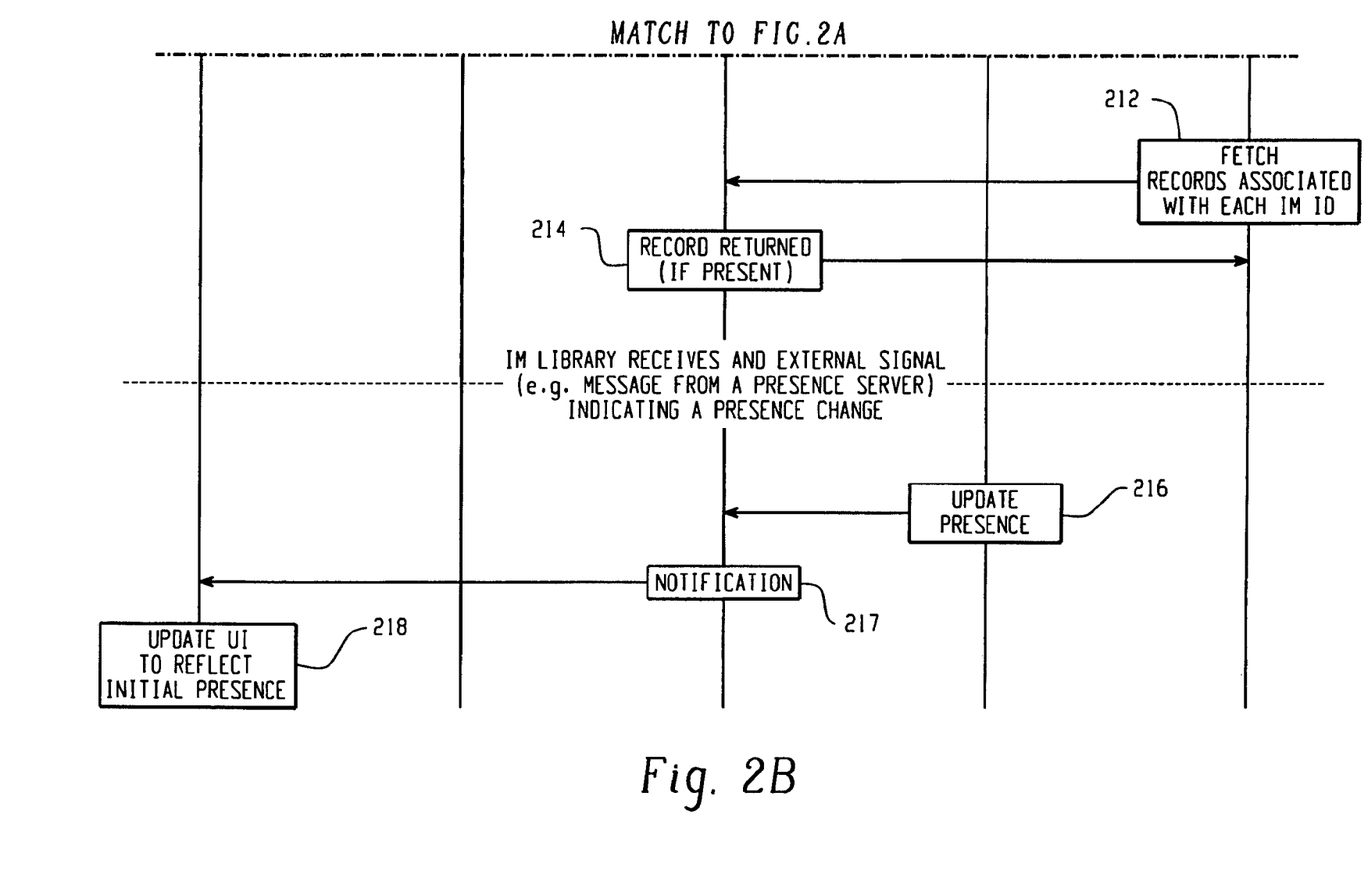

FIGS. 2A and 2B include four signal flow diagrams illustrating an example operation of the system of FIG. 1. The first signal flow diagram 202, 204 illustrates an example operation for defining the structure of the aggregated data and facilities database 22A. The second signal flow diagram 206-210 illustrates an example operation for entering contact information into the aggregated data and facilities database 22A. The third signal flow diagram 212, 214 illustrates an example operation for integrating address book information from the aggregated data and facilities database 22A into the instant messaging application 10. The forth signal flow diagram 216-218 illustrates and example operation for updating IM presence information in the aggregated data and facilities database 22A.

In the first signal flow diagram 202, 204, the structure of the aggregated data and facilities database 22A is defined by the address book library API 18 and the IM library API 12. First, an address book schema 202 is created by the address book library API 18 to define address book data fields for the database 22A, such as a first name field, a last name field, an address field, a telephone number field, an e-mail address field, a company name field, etc. The address book schema is then extended by the IM library API 12 to add instant messaging data fields, such as an IM identification field (e.g., an IM handle) and an IM presence information field. The schema will preferably include metadata associated with each field that identifies the contents of the field, such that the data fields stored in the database 22A may be generically identified by the applications 10, 16 and APIs 12, 18. For example, the address book application 16 is able to identify an IM identification field in the aggregated data and facilities database 22A from the associated metadata without executing IM-specific software. The metadata associated with each data field may, for example, identify a representation (e.g., numeric, phone format, free form, date, etc.), a range (e.g., 3 lines, 7 digits, etc.) and a label (e.g., "Last Name," "Home Number," etc.)

In the second signal flow diagram 206-210, the address book application 16 is used to enter a new contact record into the database 22A. At step 206, the address book application 16 adds an entry into the database 22A that may include both address book fields (e.g., first name, last name, phone number, etc.) and instant messaging fields (i.e., an IM identification.) When the database 22A is updated to include the new address book entry 206, a notification 207 is sent to the IM library API 12. If the IM library API 12 detects an IM identification field in the new address book entry, then the IM identification field may be used to determine other IM-specific information, such as IM presence information (e.g., currently online or offline). The address book entry may then be updated 208 by the IM library API 12 to include IM presence information, or other IM-specific data. At step 209, the address book application 16 is notified of the IM-specific data added to the address book entry, and the address book application user interface (UI) is updated to reflect the change at step 210.

In the third signal flow diagram 212, 214, address book information (e.g., first name, last name, phone number, address, etc.) is retrieved by the instant messaging application 10. At steps 212 and 214, address book records associated with one or more IM identifications are retrieved from the aggregated data and facilities database 22A by the instant messaging application 10. For example, address book records may be retrieved for each IM identification that is currently listed as online according to the IM presence information. Because the metadata for each address book entry includes information identifying the contents of each field, the IM application 16 may access and display the address book records without executing address book specific software. In this manner, address book records may be accessed, displayed and manipulated from within the instant messaging application 10. In addition, address book fields may provide links from within the instant messaging application 16 to launch other applications. For instance, a voice communication application may be launched by selecting a displayed phone number field from an address book entry.

In the forth signal flow diagram 216-218, IM-specific information, such as presence information, is automatically updated (step 216) in the aggregated data and facilities database 22A when a change is detected by the IM library API 12. For example, if the availability status (i.e., online or offline) of an IM user having an IM identification in the aggregated data and facilities database 22A changes, then the presence information associated with the IM identification is updated at step 216 to reflect the new availability status. Once the database 22A is updated, the address book application 16 is notified (step 217), and the address book application user interface (UI) is updated to reflect the change at step 218.

Figure 3:
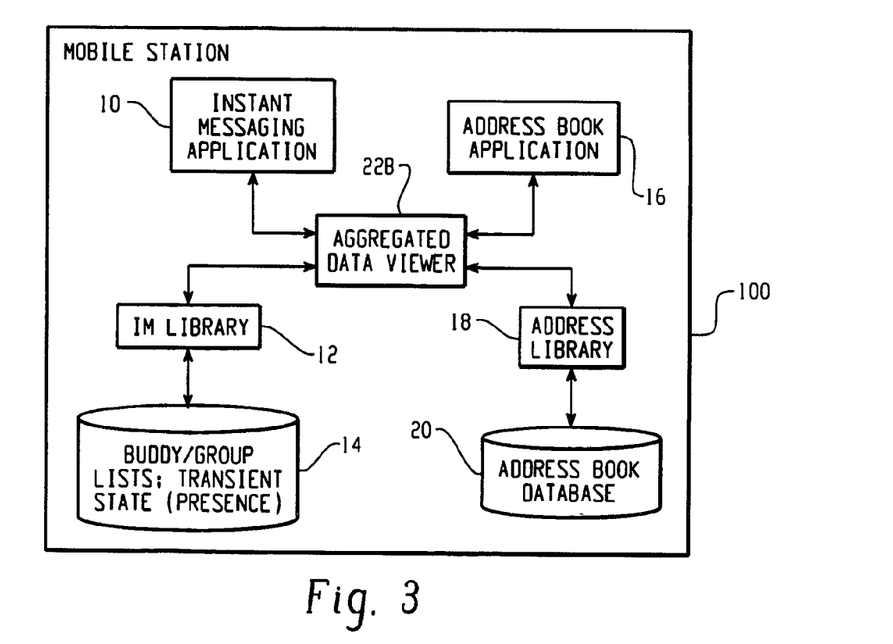
FIG. 3 is a block diagram of another example system for integrating an address book application with an instant messaging application in a mobile station.

FIG. 3 is a block diagram of another example system for integrating an address book application 16 with an instant messaging application 10 in a mobile station 100. The example system of FIG. 3 is similar to the system of FIG. 1, except that an aggregated data viewer program 22B is used in place of the aggregated data and facilities database 22A. The aggregated data viewer 22B may be operable to route data from the instant messaging and address book applications 10, 16 to the appropriate database API 12, 18. In addition, the aggregated data viewer 22B may also provide API entry points that may be used by the instant messaging and address book software applications 10, 16 to retrieve and store IM and address book information via the IM library and address book APIs 12, 18, as described below with reference to FIGS. 4A and 4B. For example, the aggregated data viewer 22B may enable the software applications 10, 16 to generate buddy or group lists or similar sets of aggregated information, as illustrated in FIGS. 5-7B.

Figure 4A:
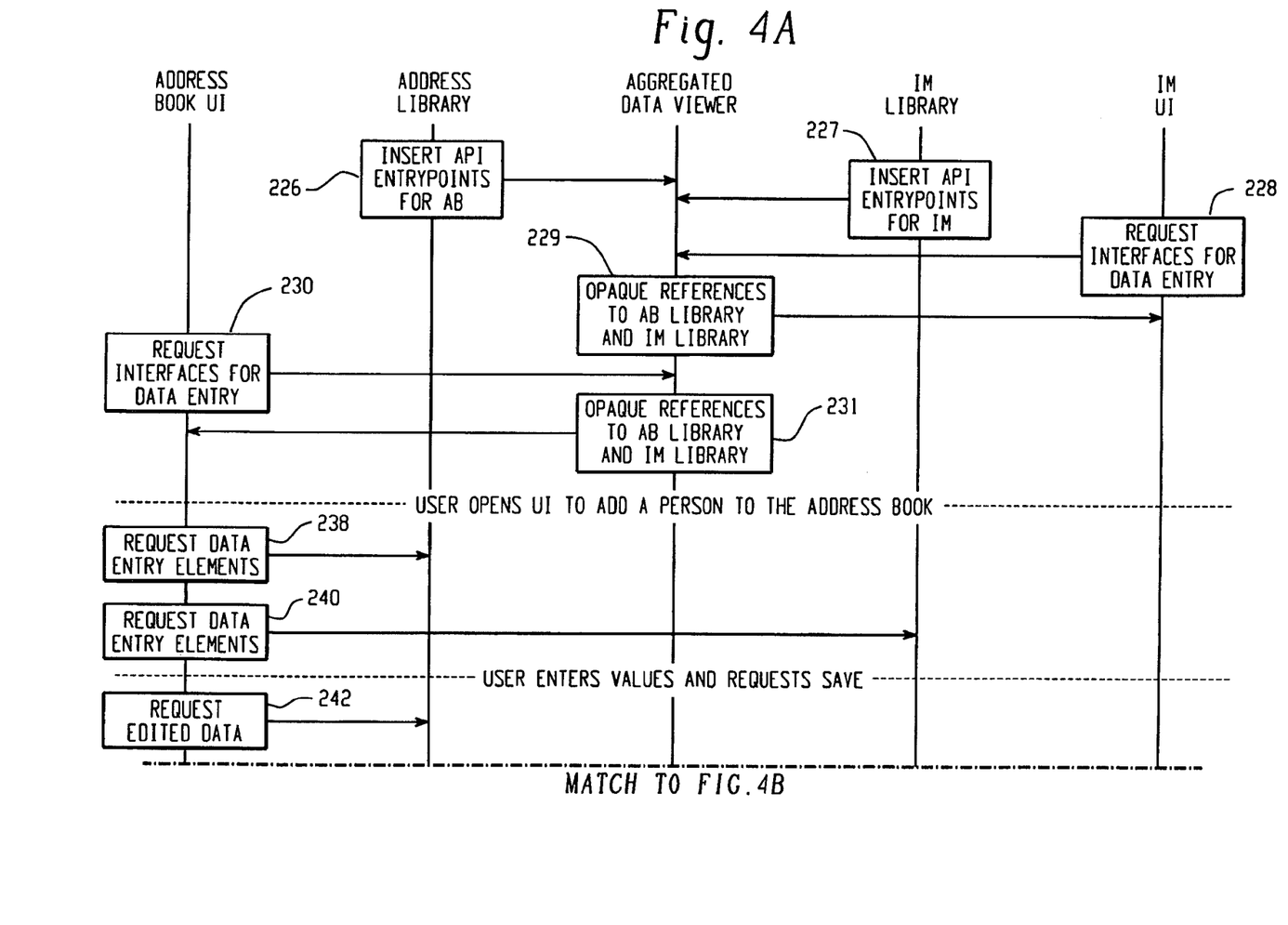
FIGS. 4A and 4B include five signal flow diagrams illustrating an example operation of the system of FIG. 3.
Figure 4B:
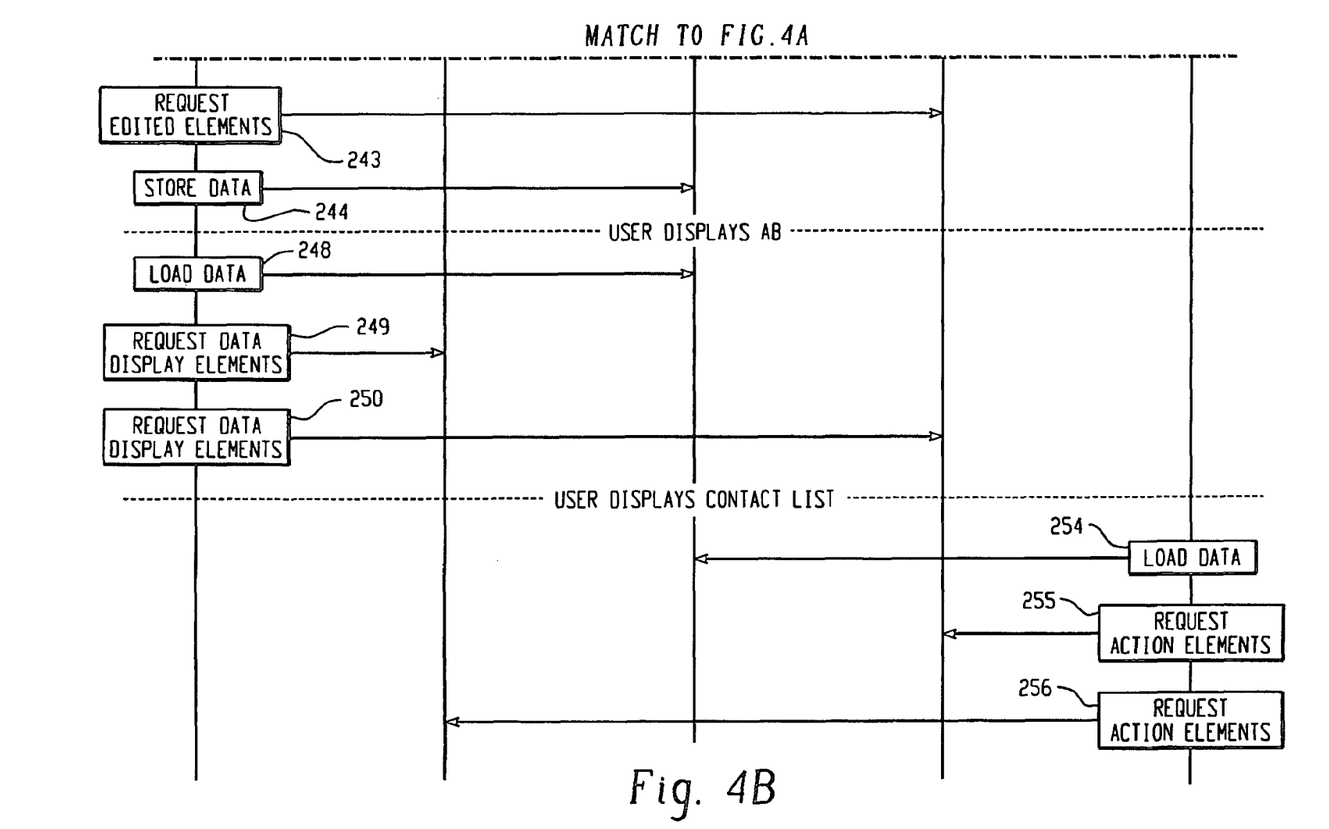

FIGS. 4A and 4B include five signal flow diagrams illustrating an example operation of the system of FIG. 3. The first signal flow diagram 226-231 illustrates an example operation for registering API entry points for accessing and manipulating data in the IM and address book databases 14, 20. The second signal flow diagram 238, 240 illustrates an example operation for requesting data entry elements for the address book application. The third signal flow diagram 242-244 illustrates an example operation for editing and storing contact information from the address book application 16, including both address book fields and IM fields. The forth signal flow diagram 248-250 illustrates an example operation for contact records on an address book application user interface. The fifth signal flow diagram 254-256 illustrates an example operation for displaying contact records with an IM application 10.

In the first signal flow diagram 226-231, API entry points are registered for the IM and address book databases 14, 20. At step 226 the address library API 18 provides API entry points (e.g., function pointer or object pointers) to the aggregated data viewer 22B specific to the address book database 20. Similarly, at step 227 the IM library API 12 provides the aggregated data view 22B with API entry points specific to the IM database 14. The aggregated data viewer 22B provides an indirection repository of API entry points. Preferably, the indirection repository may be directly supplied by the runtime environment (e.g., by providing object based storage in a Java virtual machine.) If not supplied by the runtime environment, all API registrations and references to library-specific data should preferably be identified with a guide to insure that API calls process their own data. The API entry points supplied by the AB and IM libraries 12, 18 into the indirection repository may include functions, such as library-specific data loading, library specific display, library-specific editing, library implemented actions, and/or other library-specific functions. Preferably, the specific APIs can be negotiated at runtime by defining a base entry point that request further services.

Once the API entry points have been registered with the aggregated data viewer 22B, interfaces for data entry may be requested by the IM application 12 and address book application 16 (steps 228 and 230). In response to a data entry interface request, the aggregated data viewer 22B returns opaque references to the address book library 18 and the IM library 12, as shown at steps 229 and 231.

In the second signal flow diagram 238, 240, data entry elements are requested for populating the data entry fields in the address book application user interface with both address book and IM information. The data entry elements enable the address book application 16 to display both address book and IM entry fields on its user interface and receive inputted data for the fields, without requiring the address book application 16 to recognize the content or structure of the fields. That is, the representation of the particular data entry fields is controlled by the aggregated data viewer 22A.

Once contact information has been entered for a new address book entry, the address book application 16 requests edited data elements from the address library and IM library APIs to enable storage of the data fields in either the address book or IM database 14, 20, as shown in the third signal flow diagram 242-244. The address book and IM fields in the new contact record are then stored in the appropriate database 14, 20 by the aggregated data viewer 22B in step 244.

In the forth signal flow diagram 248-250, the data fields for a contact record are loaded from the address book and IM databases 14, 20 for display in a contact record by the address book application 16. In step 248 the address book application 16 sends a request to the aggregated data viewer 22B to load the data fields for one or more contact records. Then, using API information stored with the data record, the address book application 16 may request display elements from the address and IM libraries 12, 18 for displaying the contact record data fields on the address book user interface. Because the library APIs 12, 18 control the information displayed by the address book user interface, changes to transient data (such as an IM presence field) may be immediately reflected in the address book user interface.

In the fifth signal flow diagram 254-256, the data fields for a contact record are loaded from the address book and IM databases 14, 20 for display in a contact record by the IM application 10. In step 254 the IM application 10 sends a request to the aggregated data viewer 22B to load the data fields for one or more contact records. Then, using API information stored with the data record, the IM application 10 may request display elements from the address and IM libraries 12, 18 for displaying the contact record data fields on the IM user interface. Because the library APIs 12, 18 control the information displayed by the IM user interface, the IM application 10 may perform address book related functions without having information regarding the contents of the specific address book field (e.g., linking to a voice communication function from an address book telephone number field.)

Figure 5:
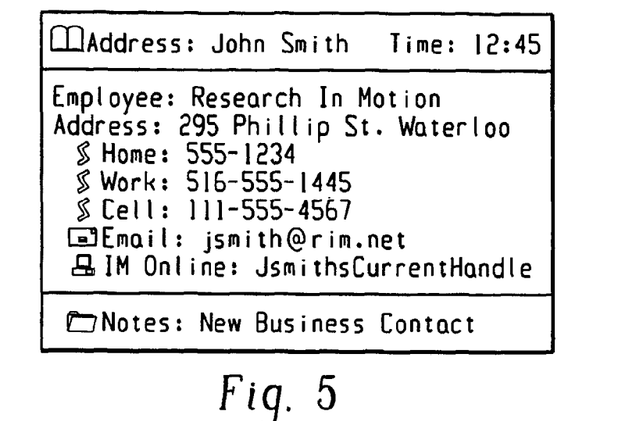
FIG. 5 illustrates one example of an address book entry that has been aggregated with instant messaging fields.

FIG. 5 illustrates one example of an address book entry that has been aggregated with instant messaging fields. With this address book entry aggregated from the IM and address book databases 14, 20, the address book application 16 may be used to add, remove, change and access address book entries with IM handles. For example, selecting an IM handle (e.g., JsmithsCurrentHandle) from the address book application 16 may launch an instant messaging communication using the instant messaging application 10.

In another example application, an IM handle may be used to run a search using the address book application 16 to locate a contact entry. For instance, with reference to the illustrated example, a mobile device user may be able to enter the IM handle "JsmithsCurrentHandle" into the address book application in order to locate and access all of the illustrated contact information for "John Smith." In addition, a user who is viewing the IM information within the address book may also see real-time presence or status information (e.g., "IM Online").

Figure 6A:
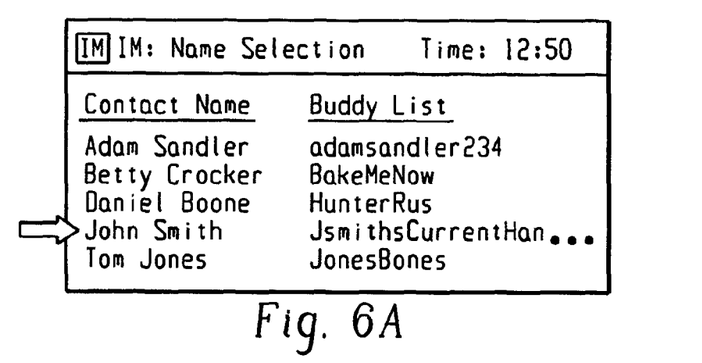
FIG. 6A illustrates one example of an instant messaging user interface in which instant messaging (IM) buddy list information is aggregated with address book contact name information.

FIG. 6A illustrates one example of an instant messaging user interface in which IM buddy list information is aggregated with address book contact name information. This enables a user to select from address book contact names associated with the IM handles from the IM database 14. The list of address book contact names is aggregated from the address book database 20 and includes only contact names that are associated with IM handles. This correlation between address book data and IM data may, for example, be controlled by the IM library API 12 and/or the address library API 18, or by the aggregated data viewer 22B. From the illustrated lists, a device user may scroll and select either an address book contact name or an IM handle to initiate an instant messaging session.

Figure 6B:
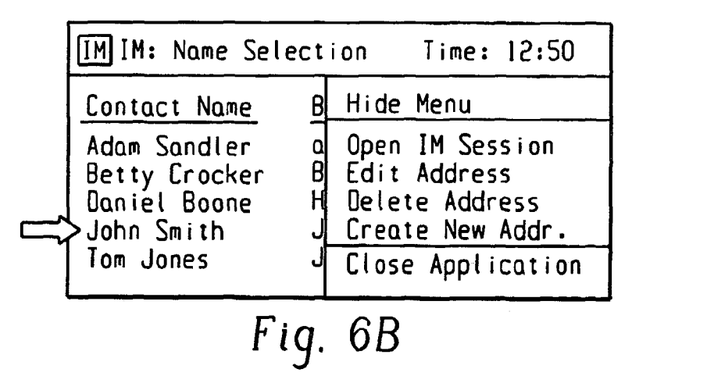
FIG. 6B illustrates an example menu function that may be accessed from the user interface of FIG. 6A.

FIG. 6B illustrates an example menu function that may be accessed from the user interface of FIG. 6A. The illustrated menu function may, for example, be accessed from the instant messaging application 10 by selecting an address book contact name or associated IM handle. Options may be selected from the menu to open an instant messaging session, edit an address book entry or IM handle, delete an address book entry or IM handle, create a new address book entry, or to perform other similar functions. The options may, for example, be selected from the user interface using a touch-screen, cursor keys, a mouse, a roller wheel, or some other input device(s). In this manner address book entries may be added, deleted and/or modified from within the IM application 10.

The aggregated contact record illustrated in FIGS. 6A and 6B may also enable other inquires, additions and/or modification to be performed between the instant messaging and address book applications 10, 16. For example, if the user is adding an IM contact with the IM application 10, then the IM application 10 can propagate this information into the address book. During this propagation the IM application 10 may first verify that the new IM contact does not already exist. In addition, presence information may be modified within the address book database on a real-time basis.

Figure 7A:
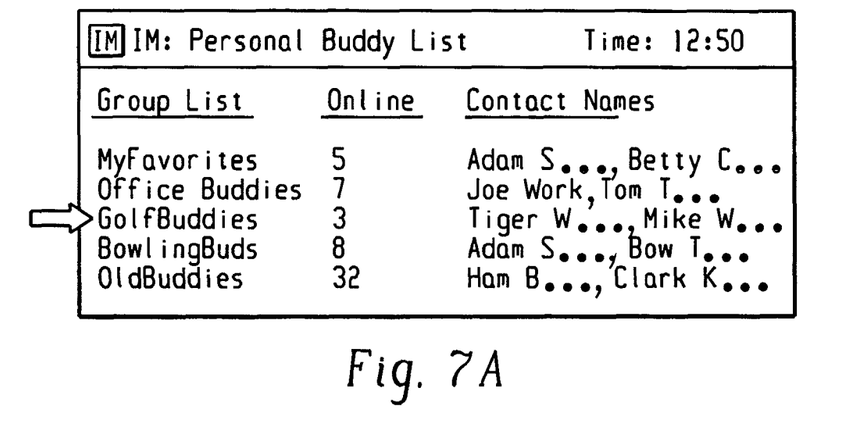
FIG. 7A illustrates one example of an instant messaging user interface in which IM group list and presence information is aggregated with address book contact name information.
Figure 7B:
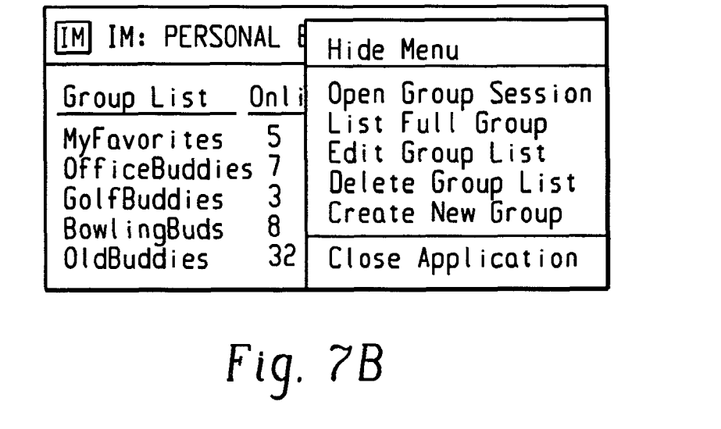
FIG. 7B illustrates an example menu for selecting options available from the user interface of FIG. 7A.

FIG. 7A illustrates one example of an instant messaging user interface in which IM group list and presence information is aggregated with address book contact name information. By aggregating the information in this manner, a synergy may be created between the online presence information and the address book contact names associated with an IM group. For instance, the example of FIG. 7A shows that the IM group "MyFavorites" has 5 members currently present (i.e., online). Options available for the IM group data may be accessed by selecting from a menu, as illustrated in FIG. 7B. For example, options may be selected to open an instant messaging session with the currently present members of a selected group, list all of the members of a group, edit the members of the group, delete a group, create a new group, or perform other IM functions.

Figure 8:
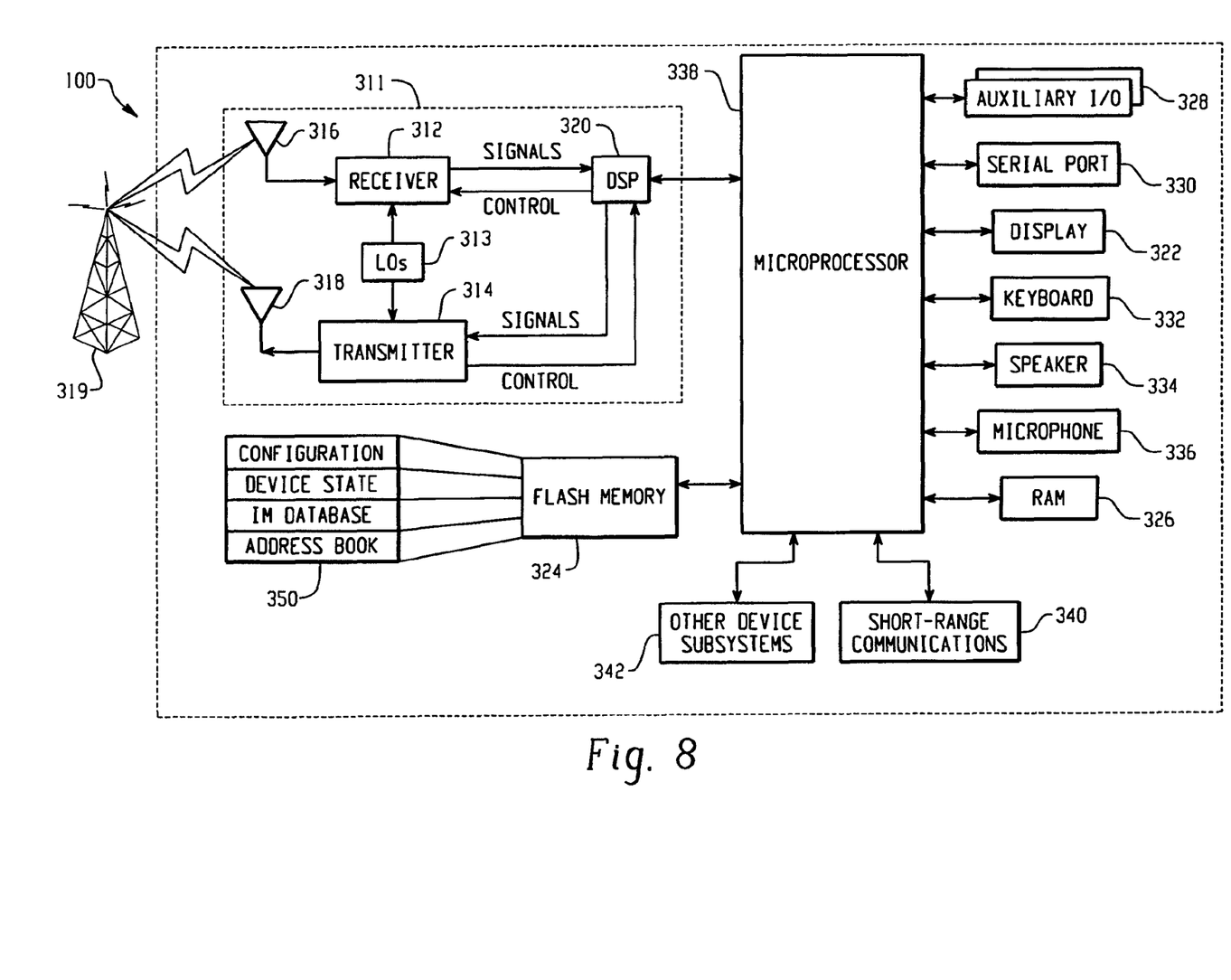
FIG. 8 is a block diagram of an example mobile station.

FIG. 8 is a block diagram of an example mobile station 100 in which the above-described system may be implemented. The mobile station 100 includes a processing subsystem 338, a communications subsystem 311, a short-range communications subsystem 340, a memory subsystem 324, 326, and various other device subsystems and/or software modules 342. The mobile station 100 also includes a user interface, which may include a display 322, a keyboard 332, a speaker 334, a microphone 336, one or more auxiliary input/output devices 328, a serial port 330, and/or other user interface devices.

The processing subsystem 338 controls the overall operation of the mobile station 100. Operating system software executed by the processing subsystem 338 may be stored in a persistent store, such as a flash memory 324, but may also be stored in other types of memory devices in the memory subsystem, such as a read only memory (ROM) or similar storage element. The flash memory 324 may be segregated into different areas for both computer programs and program data storage 350. For instance, a plurality of PIM software applications may allocate a portion of the flash memory 324 for its database requirements. Flash memory segments 350 may, for example, include configuration information, mobile station state information (e.g., current radio network and region), address book information, calendar profiles, instant message configuration, telephone profiles and other PIM information, such as tasks and todo lists. In addition, the flash memory 324 may include a plurality of software application programs executed by the processing subsystem 328, such as a voice communication module, a data communication module, and/or other software modules.

System software, specific device applications, or parts thereof, may be temporarily loaded into a volatile store, such as a random access memory (RAM) 326. Communication signals received by the mobile station 100 may also be stored to RAM 326.

Communication functions, including data and voice communications, are performed through the communication subsystem 311, and possibly through the short-range communications subsystem 340. The communication subsystem 311 includes a receiver 312, a transmitter 314 and one or more antennas 316, 318. In addition, the communication subsystem 311 also includes a processing module, such as a digital signal processor (DSP) 320 or other processing device (s), and local oscillators (LOs) 313. The specific design and implementation of the communication subsystem 311 is dependent upon the communication network in which the mobile station 100 is intended to operate. For example, a mobile station 100 may include a communication subsystem 311 designed to operate within the Mobitex™ mobile communication system, the DataTAC™ mobile communication system, a GSM network, a GPRS network, a UMTS network, and/or an EDGE network.

Network access requirements vary depending upon the type of communication system. For example, in the Mobitex and DataTAC networks, mobile stations are registered on the network using a unique personal identification number or PIN associated with each device. In UMTS and GSM/GPRS networks, however, network access is associated with a subscriber or user of a device. A GPRS device therefore requires a subscriber identity module, commonly referred to as a SIM card, in order to operate on a GSM/GPRS network.

When required network registration or activation procedures have been completed, the mobile station 100 may send and receive communication signals over the communication network 319. Signals received by the antenna 316 from the communication network 319 are routed to the receiver 312, which provides signal amplification, frequency down conversion, filtering, channel selection, etc., and may also provide analog to digital conversion. Analog-to-digital conversion of the received signal allows the DSP to perform more complex communication functions, such as demodulation and decoding. In a similar manner, signals to be transmitted to the network 319 are processed (e.g., modulated and encoded) by the DSP 320 and are then provided to the transmitter 314 for digital to analog conversion, frequency up conversion, filtering, amplification and transmission to the communication network 319 (or networks) via the antenna 318.

In addition to processing communication signals, the DSP 320 provides for receiver 312 and transmitter 314 control. For example, gains applied to communication signals in the receiver 312 and transmitter 314 may be adaptively controlled through automatic gain control algorithms implemented in the DSP 320.

In a data communication mode, a received signal, such as a text message or web page download, is processed by the communication subsystem 311 and input to the processing device 338. The received signal is then further processed by the processing device 338 for output to a display 322, or alternatively to some other auxiliary I/O device 328. A device user may also compose data items, such as email messages, using a keyboard 332 and/or some other auxiliary I/O device 328, such as a touchpad, a rocker switch, a thumb-wheel, or some other type of input device. The composed data items may then be transmitted over the communication network 319 via the communication subsystem 311.

In a voice communication mode, overall operation of the device is substantially similar to the data communication mode, except that received signals are output to a speaker 334, and signals for transmission are generated by a microphone 336. Alternative voice or audio I/O subsystems, such as a voice message recording subsystem, may also be implemented on the device 100. In addition, the display 322 may also be utilized in voice communication mode, for example to display the identity of a calling party, the duration of a voice call, or other voice call related information.

The short-range communications subsystem 340 enables communication between the mobile station 100 and other proximate systems or devices, which need not necessarily be similar devices. For example, the short-range communications subsystem 340 may include an infrared device and associated circuits and components, or a Bluetooth™ communication module to provide for communication with similarly-enabled systems and devices.

This written description uses examples to disclose the invention, including the best mode, and also to enable a person skilled in the art to make and use the invention. The patentable scope of the invention may include other examples that occur to those skilled in the art. For example, in one alternate embodiment a mobile device may include more than one instant messaging system, with each instant messaging system being integrated together and with the address book database as described above.

The invention claimed is:

1. A method for operating a mobile station comprising:
   storing instant messaging data in an instant messaging database in the mobile station and address book data in an address book database in the mobile station, the instant messaging data including a listing of instant messaging contacts and corresponding instant messaging presence information, the address book data including address book contacts and, for each address book contact, at least one of a mailing address, a phone number, and an email address;
   relating instant messaging data from the instant messaging database to address book data from the address book database;
   grouping two or more address book contacts into a group, the address book contacts associated with corresponding instant messaging contacts;
   presenting the group as a group data in a transient data list;
   detecting a selection of an option to open a messaging session with the group; and
   opening a messaging session with the address book contacts of the selected group;
   wherein the group data comprises a group name and presence information about two or more contacts that are associated with the two or more address book contacts in the group;
   wherein the presence information indicates a number of the contacts of the address book contacts in the group that are currently available to be contacted.

2. The method of claim 1 wherein the group is an instant messaging group.

3. The method of claim 1 wherein the transient data list is a buddy list.

4. A mobile station comprising:
   a hardware processor;
   an instant messaging database for storing instant messaging data, the instant messaging data including a listing of instant messaging contacts and corresponding instant messaging presence information;
   an address book database for storing address book data, the address book data including address book contacts and, for each address book contact, at least one of a mailing address, a phone number, and an email address;
   an aggregated data and facilities database for relating instant messaging data from the instant messaging database to address book data from the address book database;
   an address book application that is executable by the hardware processor to group two or more address book contacts into a group, the address book contacts associated with corresponding instant messaging contacts;
   a transient data list in which the group is presented as a group data;
   a user interface configured to detect a selection of an option to open a messaging session with the group; and
   a messaging application configured to open a messaging session with the address book contacts of the selected group;
   wherein the group data comprises a group name and presence information about two or more contacts that are associated with the two or more address book contacts in the group;
   wherein the presence information indicates a number of the contacts of the address book contacts in the group that are currently available to be contacted.

5. The mobile station of claim 4 wherein the group is an instant messaging group.

6. The mobile station of claim 4 wherein the transient data list is a buddy list.

7. The mobile station of claim 4 wherein the messaging application is an instant messaging application.

8. A user interface for use in a mobile station, the mobile station including a system for integrating an address book application with an instant message (IM) application that includes an instant messaging database for storing instant messaging data, an address book database for storing address book data, and an aggregated data and facilities database for relating instant messaging data from the instant messaging database with address book data from the address book database, the address book data including address book contacts and, for each address book contact, at least one of a mailing address, a phone number, and an email address, the user interface comprising:
   a hardware processor;
   a buddy list that includes a list of IM handles that are stored in the instant messaging database and that are contactable using the instant messaging application;
   a group contact list that provides address book data corresponding to one or more of the IM handles in the buddy list, the group contact list grouping two or more address book contacts into a group, the address book contacts stored in the address book database and associated with corresponding IM handles;
   a transient data list in which the group is presented as a group data; and
   a messaging application that is executable by the hardware processor, and when executed the messaging application being configured to detect a selection of an option to open a messaging session with the group and further configured to open a messaging session with the address book contacts of the selected group;

wherein the group data comprises a group name and presence information about two or more contacts that are associated with the two or more address book contacts in the group;

wherein the presence information indicates a number of the contacts of the address book contacts in the group that are currently available to be contacted.

* * * * *